United States Patent [19]

Allen et al.

[11] 4,120,511
[45] Oct. 17, 1978

[54] SADDLE/MAIN FRAME FABRICATION

[75] Inventors: Royce D. Allen, East Peoria; Rollen G. Easter, Tremont, both of Ill.

[73] Assignee: Caterpillar Tractor Co., Peoria, Ill.

[21] Appl. No.: 765,517

[22] Filed: Feb. 4, 1977

[51] Int. Cl.² .............................................. B62D 21/00
[52] U.S. Cl. ....................................... 280/795; 52/690
[58] Field of Search .................. 280/106; 52/690, 721, 52/731

[56] References Cited

U.S. PATENT DOCUMENTS 2,107,382  2/1938  Maddock ......................... 280/106 R
2,113,403  4/1938  Harmon ............................ 280/106 R
2,194,356  3/1940  Eklund ............................ 280/106 R Primary Examiner—Philip Goodman
Attorney, Agent, or Firm—Phillips, Moore, Weissenberger, Lempio & Majestic

[57] ABSTRACT

A frame of a vehicle includes a pair of laterally spaced beams, each including upper and lower members and first and second sidewall means fixed thereto. A saddle extends between the beams, each end of the saddle including an end plate which is positioned in an opening of an associated sidewall means of a beam, and fixed to that beam.

8 Claims, 4 Drawing Figures

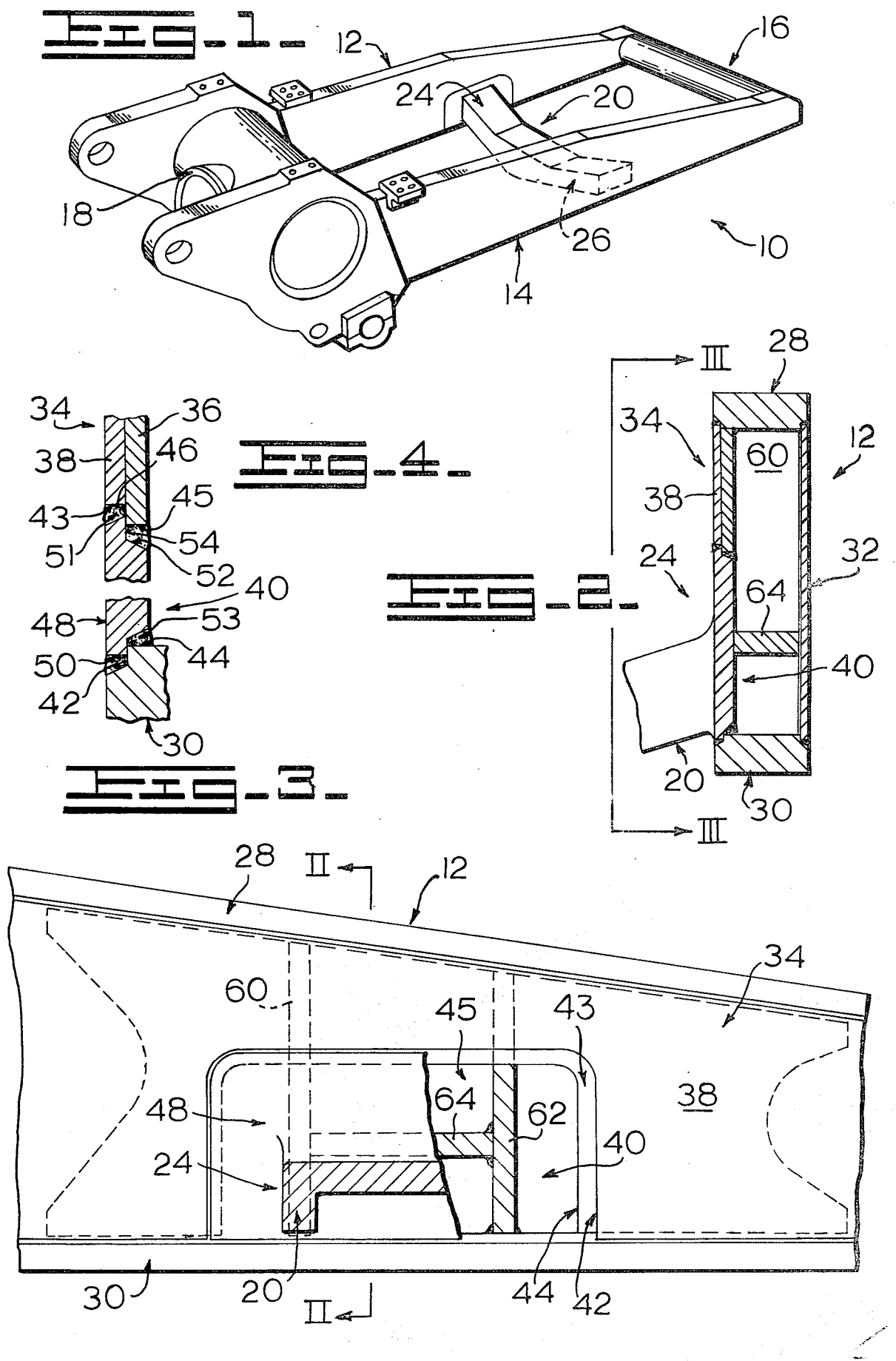

SADDLE/MAIN FRAME FABRICATION

BACKGROUND OF THE INVENTION

This invention relates to frame structure, and more particularly to structure for mounting the saddle of a vehicle to the main frame thereof.

In general, it is well known to provide a vehicle including a pair of beams and a saddle, the ends of which are fixed to the beams, with an equalizer bar pivotally mounted to the saddle. The ends of the equalizer bar are in turn pivotally mounted to movable vehicle tracks.

In the usual system, the ends of the saddle bear against and are welded to the respective inwardly facing plates of the beams. While such a system has been proved relatively effective in operation, it is to be understood that such a saddle is very highly loaded, since loads placed on the tracks are passed through the equalizer bar to the saddle, and then to the main frame. It will therefore be understood that highly efficient distribution of forces applied through the saddle to the main frame is desirable.

SUMMARY OF THE INVENTION

It is accordingly an object of this invention to provide a connection between a saddle and a main frame of a vehicle, wherein force applied to the saddle is efficiently distributed to the main frame to which the saddle is fixed.

It is a further object of this invention to provide apparatus which, while fulfilling the above object, is extremely simple in design and manufacture, and effective in use.

Broadly stated, the invention comprises frame structure comprising first beam means comprising upper and lower members, first sidewall means fixed to the upper and lower members, and second sidewall means fixed to the upper and lower members. The invention further comprises second beam means defining an end portion positioned in an opening defined by the second sidewall means and one of the upper and lower members, and fixed to the second sidewall means.

BRIEF DESCRIPTION OF THE DRAWINGS

These and other objects of the invention will become apparent from a study of the following specification and drawings, in which:

FIG. 1 is a perspective view of a frame structure incorporating the present invention;

FIG. 2 is a sectional view taken along the line II—II of FIG. 3;

FIG. 3 is a view taken along the line III—III of FIG. 2; and

FIG. 4 is an enlarged view of a portion of the structure shown in FIG. 2.

DESCRIPTION OF THE PREFERRED EMBODIMENT

Shown in FIG. 1 is the main frame 10 of a vehicle, such main frame 10 including first and second beam means 12, 14 connected by a front interconnecting portion 16 and a rear interconnecting portion 18. Also interconnecting the beam means 12, 14 is a saddle 20 to which, for example, an equalizer bar of the vehicle may be pivotally attached.

It is to be understood that such saddle 20 must be fixed to the first and second beam means 12, 14 in a most secure manner. Attention is directed to FIGS. 2 and 3, showing the mounting of one end 24 of the saddle 20 to the beam means 12, it being understood that the mounting of the other end 26 of the saddle 20 to the beam means 14 is identical. As shown in such FIGS. 2 and 3, the beam means 12 are made up of upper and lower members 28, 30, and a first sidewall 32 fixed by welding to the upper and lower members 28, 30. Second sidewall means 34 are also fixed to the upper and lower members 28, 30. Such second sidewall means 34 are made up of an inner individual wall member 36 fixed by welding to the upper and lower members 28, 30, and an outer individual wall member 38, fixed by welding to the upper and lower members 28, 30, the individual wall members 36, 38 lying against each other.

The second sidewall means 34 made up of wall member 36 and wall member 38, and the lower member 30, define a lateral beam opening 40. The individual wall member 38 and lower member 30 define surfaces 42 in turn defining a first, outward portion 43 of the opening. The individual wall member 36 and lower member 30 together defines surfaces 44 defining a second, inward portion 45 of the opening, of generally smaller overall size than the first opening portion 43. A continuous surface 46 defined by the wall member 36 connects these surfaces 42, 44.

The saddle 20, which takes the form of second beam means, defines an end portion 24 in the form of an end plate 48. The end plate 48 defines a first surface 50 generally sized to fit within the first portion 43 of the opening 40, with the surfaces 42 defining the first, outward portion 43 of the opening 40 and the first surface 50 of the end plate 45 together defining a first continuous gap 51 therebetween. The end plate 48 further defines a second surface 52 generally sized to fit within the second portion 45 of the opening 40, with the surfaces 44 defining the second, inward portion 45 of the opening 40 and the second surface 52 of the end plate 48 together defining a second continuous gap 53 therebetween. The end plate 48 defines a continuous surface 54 connecting the first and second surfaces 50, 52. The end plate 48 is positioned such that the surface 54 is in contact with the surface 46. The end plate 48 is positioned substantially coplanar with the second sidewall means 34, with the end portion 48 positioned in the opening 40. The end portion 48 is fixed to the individual wall member 36 and lower member 30 by weld material filling the appropriate continuous gap 53. The end plate 48 is also fixed to the individual wall member 38 and the lower member 30 by weld material filling the appropriate continuous gap 51.

A reinforcing member 60 extends between the upper and lower members 28, 30 and is fixed thereto by welding. A second reinforcing member 62 also extends between the upper and lower members 28, 30 and is fixed thereto by welding. A third reinforcing member 64 extends between and is fixed by welding to the first and second reinforcing members 60, 62. These first, second and third reinforcing members 60, 62, 64 are positioned in the area of the opening 40.

It will be seen that, because of the particular structure set forth above, the end portions of the saddle 20 are securely fixed to the respective beam means 12, 14. Effective force distribution from the saddle 20 to the beam means 12, 14 takes place, in particular because of the placement of the end plates of the saddle in openings, as at 40, and the stepped portions of the end plates and wall means associated therewith. The reinforcing members, as at 60, 62, 64, in the area of the openings of the beam means aid in achieving high rigidity of structure and effective transfer of forces thereto.

The embodiments of the invention in which an exclusive property or privilege is claimed are defined as follows:

1. Frame structure comprising:
    first beam means comprising upper and lower members,
    first sidewall means fixed to the upper and lower members, and second sidewall means fixed to the upper and lower members; and
    second beam means defining an end portion positioned in an opening defined by the second sidewall means and one of the upper and lower members, and fixed to the second sidewall means;
    wherein the end portion comprises an end plate positioned substantially coplanar with the second sidewall means; and
    first and second reinforcing members respectively extending between and fixed to the upper and lower members, and a third reinforcing member extending between and fixed to the first and second reinforcing members in the area of the opening.

2. The apparatus of claim 1 wherein the end portion is fixed to said one of the upper and lower members.

3. The apparatus of claim 1 wherein the opening is defined by the second sidewall means and the lower member, and wherein the end portion is fixed to the lower member.

4. Frame structure comprising:
    first beam means comprising upper and lower members,
    first sidewall means fixed to the upper and lower members, and second sidewall means fixed to the upper and lower members; and
    second beam means defining an end portion positioned in an opening defined by the second sidewall means and one of the upper and lower members, and fixed to the second sidewall means;
    wherein the end portion comprises an end plate positioned substantially coplanar with the second sidewall means; and
    wherein the second sidewall means comprise first and second individual wall members, one lying against the other, each being fixed to the upper member and lower member.

5. The apparatus of claim 4 wherein the first individual wall member and lower member define surfaces defining a first, outward portion of the opening, and wherein the second individual wall member and lower member define surfaces defining a second, inward portion of the opening, of generally smaller overall size than the first opening portion, and wherein the end plate defines a first surface generally sized to fit within the first portion of the opening, with the surfaces defining the first, outward portion of the opening and the first surface of the end plate together defining a first continuous gap therebetween, and further comprising weld material filling the first continuous gap, the end plate defining a second surface generally sized to fit within the second portion of the opening, with the surfaces defining the second, inward portion of the opening and the second surface of the end plate together defining a second continuous gap therebetween, and further comprising weld material filling the second continuous gap.

6. The apparatus of claim 5 wherein the second sidewall means and lower member define a first continuous surface connecting the surfaces defining the first and second portions of the opening, and wherein the end plate defines a second continuous surface connecting the first and second surfaces of the end plate and in contact with the first continuous connecting surface.

7. The apparatus of claim 6 and further comprising first and second reinforcing members respectively extending between and fixed to the upper and lower members, and a third reinforcing member extending between and fixed to the first and second reinforcing members in the area of the opening.

8. Vehicle frame structure comprising:
    first beam means comprising upper and lower members,
    first sidewall means fixed to the upper and lower members, and second sidewall means fixed to the upper and lower members; and
    second beam means defining a beam and an end portion which end portion is positioned in an opening defined by the second sidewall means and one of the upper and lower members, and fixed to the second sidewall means; and
    wherein the end portion comprises an end plate positioned substantially coplanar with the second sidewall means, the periphery of which end portion is substantially greater than the periphery of the transverse cross-section of the beam.

* * * * *